United States Patent
Weigen

(10) Patent No.: US 8,094,039 B2
(45) Date of Patent: Jan. 10, 2012

(54) APPLICATION SOLUTION OF INFRARED COMMUNICATION IN AUTOMATIC SENSING SANITARY WARES

(75) Inventor: Chen Weigen, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 383 days.

(21) Appl. No.: 12/329,793

(22) Filed: Dec. 8, 2008

(65) Prior Publication Data

US 2009/0153345 A1 Jun. 18, 2009

Related U.S. Application Data

(63) Continuation-in-part of application No. PCT/IB2007/001487, filed on Jun. 4, 2007.

(51) Int. Cl.
*G08B 21/00* (2006.01)

(52) U.S. Cl. ............. 340/686.1; 340/539.23; 340/545.3; 340/545.6; 340/556; 340/573.1

(58) Field of Classification Search ............... 340/686.1, 340/539.23, 545.3, 545.6, 556, 573.1, 573.7
See application file for complete search history.

(56) References Cited

U.S. PATENT DOCUMENTS

| | | | | |
|---|---|---|---|---|
| 5,276,595 | A * | 1/1994 | Patrie | 362/101 |
| 6,618,864 | B2 * | 9/2003 | Veal | 4/406 |
| 7,126,551 | B2 * | 10/2006 | Winter | 343/719 |
| 7,966,899 | B2 * | 6/2011 | Liu et al. | 73/863.31 |
| 2002/0029412 | A1 * | 3/2002 | Veal | 4/406 |
| 2010/0065126 | A1 * | 3/2010 | Segal | 137/1 |
| 2010/0170569 | A1 * | 7/2010 | Weigen | 137/1 |

FOREIGN PATENT DOCUMENTS

| | | |
|---|---|---|
| CN | 1421577 A | 6/2003 |
| CN | 1595464 A | 3/2005 |
| CN | 1888334 A | 1/2007 |
| JP | 2002115300 A | 4/2002 |

OTHER PUBLICATIONS

International Search Report: PCT/IB2007/001487.

* cited by examiner

*Primary Examiner* — Daryl Pope
(74) *Attorney, Agent, or Firm* — Foley & Lardner LLP

(57) ABSTRACT

An application solution using infrared communication in automatic sensing for use in bathroom sanitary wares. A main circuit board emits an infrared pulse signal on one side to detect a user. After a user is detected, the main circuit board produces a group of pulse collated code opening valve signals to drive another infrared emitting diode to send this collated code. The infrared receiving diode on the slave board receives this collated code, transforms it into a pulse signal and then transmits it to the chip for procession. If the collated codes agree with each other, the solenoid valve can be controlled to open or close the valve. At the same time, the collated code is returned to the main circuit board, which consequently stops emitting the collated code signal for opening the valve.

14 Claims, 6 Drawing Sheets

Main circuit board | Slave circuit board

Notes: If it detects manual valve opening, this enjoys top priority. Through A/D collection, conduct power test frequently. If there is no power, the no-power signal light flashes. Battery needs to be changed.

APPLICATION SOLUTION OF INFRARED COMMUNICATION IN AUTOMATIC SENSING SANITARY WARES

FIELD OF INVENTION

The present invention relates to an application solution of infrared communication in automatic sensing for bathroom sanitary wares.

BACKGROUND OF THE INVENTION

There are two major types of the existing automatic sensing sanitary wares. The first type (Type A) includes an electronic sensing component that is installed on the toilet, and it forms a whole body with the valve body. It detects a user from the front side. Its disadvantages are that the opening and closing of the toilet cover may cause error flushing of the toilet, and the whole valve body needs to be disassembled for maintenance, which is very inconvenient. The second type (Type B) includes an electronic sensing component that is separate from the valve body and is installed into the wall beside the toilet. It detects a user from one side. Though it overcomes the disadvantage of Type A, it is connected with the solenoid valve inside the toilet with leads, which is inconvenient for lead arrangement during installation and does not present a pleasant appearance.

SUMMARY OF THE INVENTION

The present invention uses a master and a slave circuit board, and infrared communication to realize automatic control. The master circuit board is the electronic sensing assembly, and the slave circuit board is a solenoid valve control assembly; thus, the electronic sensing component becomes free-standing and can be installed on one side of the toilet to detect a user. The slave circuit board is installed on the toilet so that error flushing during the opening and closing of the toilet cover can be avoided. Moreover, infrared communication technology is adopted to connect the solenoid control part, which is more convenient for future installation and maintenance of the equipment, and avoids the trouble of wire arrangement for installation.

DESCRIPTION OF THE PREFERRED EMBODIMENTS

Figure 1:
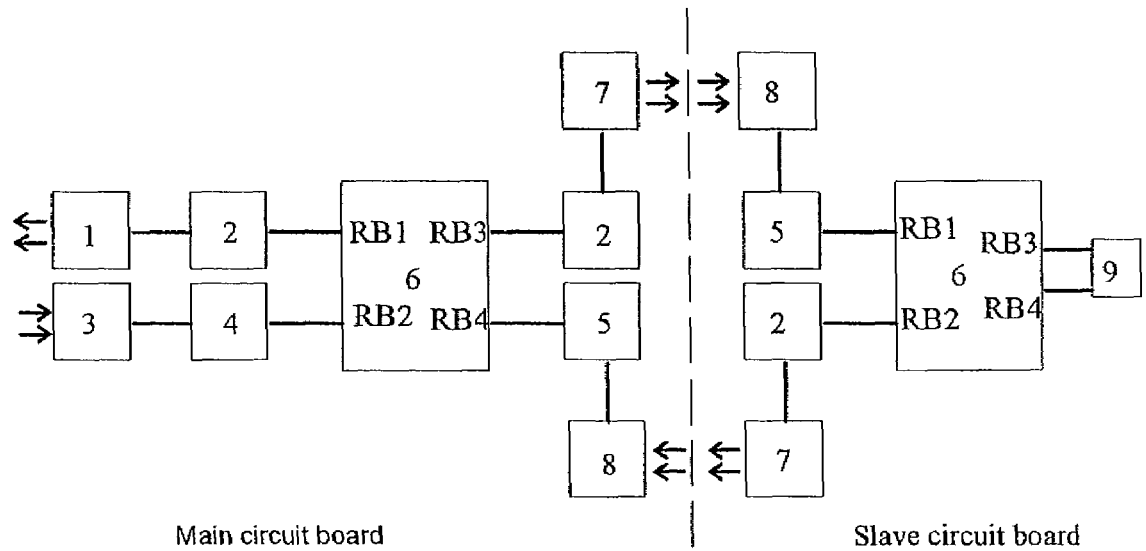
FIG. 1 is the hardware principle flow chart.

FIG. 1 shows the hardware principle. It consists of two major parts: the main board and the slave board. The RB1 pin of the chip (6) on the main board transmits pulse signals at designated intervals to the user oriented sending drive circuit (2), and then drives emitting diode (1) to emit infrared signals. When the main board detects a user, the receiving diode (3) receives a returned signal, which is processed by user-signal amplifying circuit (4) before imputed to the chip (6) on the main circuit board through the RB2 pin. When the chip (6) confirms the signal as effective sensing signals, the RB3 pin outputs a collated code signal saved in itself. The signal drives the collated code emitting diode (7) to send a collated code signal to the slave circuit board through sending drive circuit (2). At this time, the collated code receiving diode (8) of the slave circuit board receives the collated code signal sent by the main board; then, the signal is processed by collated code signal amplifying circuit (5) and is input through the RB1 pin to the chip (6) on the slave board. When the chip (6) judges that the signal agrees with the stored collated code signal, the chip confirms that this signal is the correct valve-opening signal. The chip controls the solenoid valve (9) and opens the valve. At the same time, the chip (6) outputs the collated code signal through the RB2 pin, and drives the collated code emitting diode (7) to transmit the collated code signal through the sending drive component (2). The collated code receiving diode (8) on the main board receives the collated code signal sent from the slave board. Afterwards, the signal is processed by the collated code signal amplifying part (5) and input into the chip (6) on the main board through the RB4 pin. When the chip (6) judges that the signal is the correct collated code signal, it stops sending the collated code signal. When the main board judges that the received collated code signal does not agree with the stored signal, the main board continues to send the collated code signal until it receives the correct collated code signal.

Figure 2:
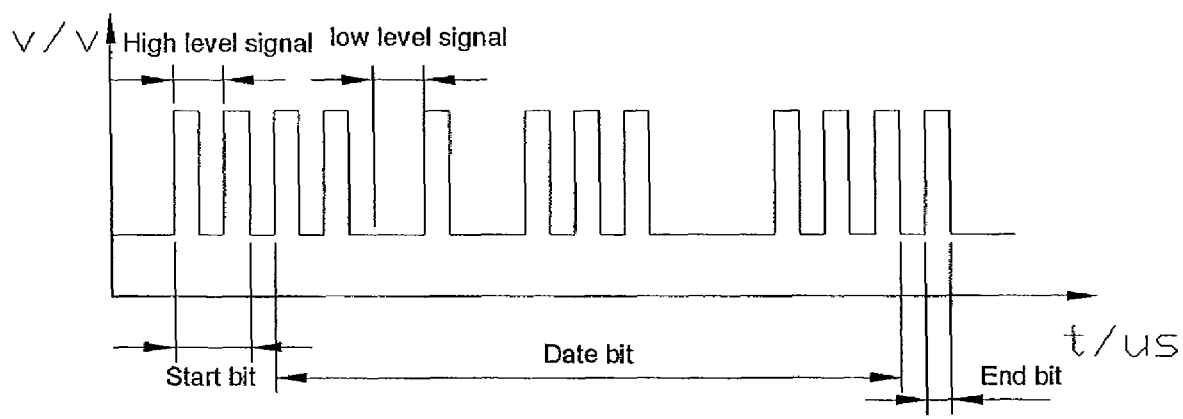
FIG. 2 is the collated code wave schematic drawing.
Figure 4A:
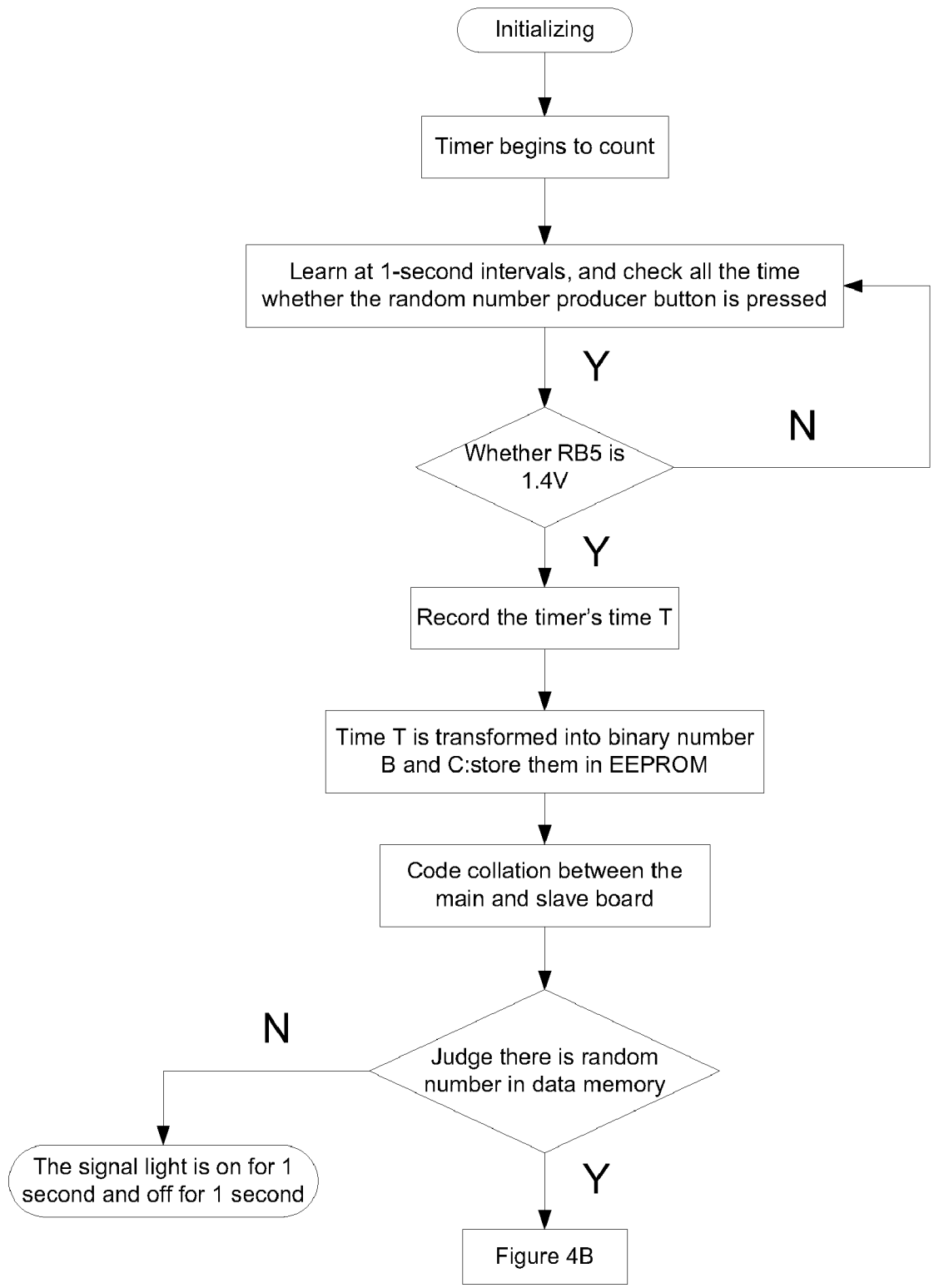
FIG. 4A is the software flow drawing of the master circuit board.
Figure 4B:
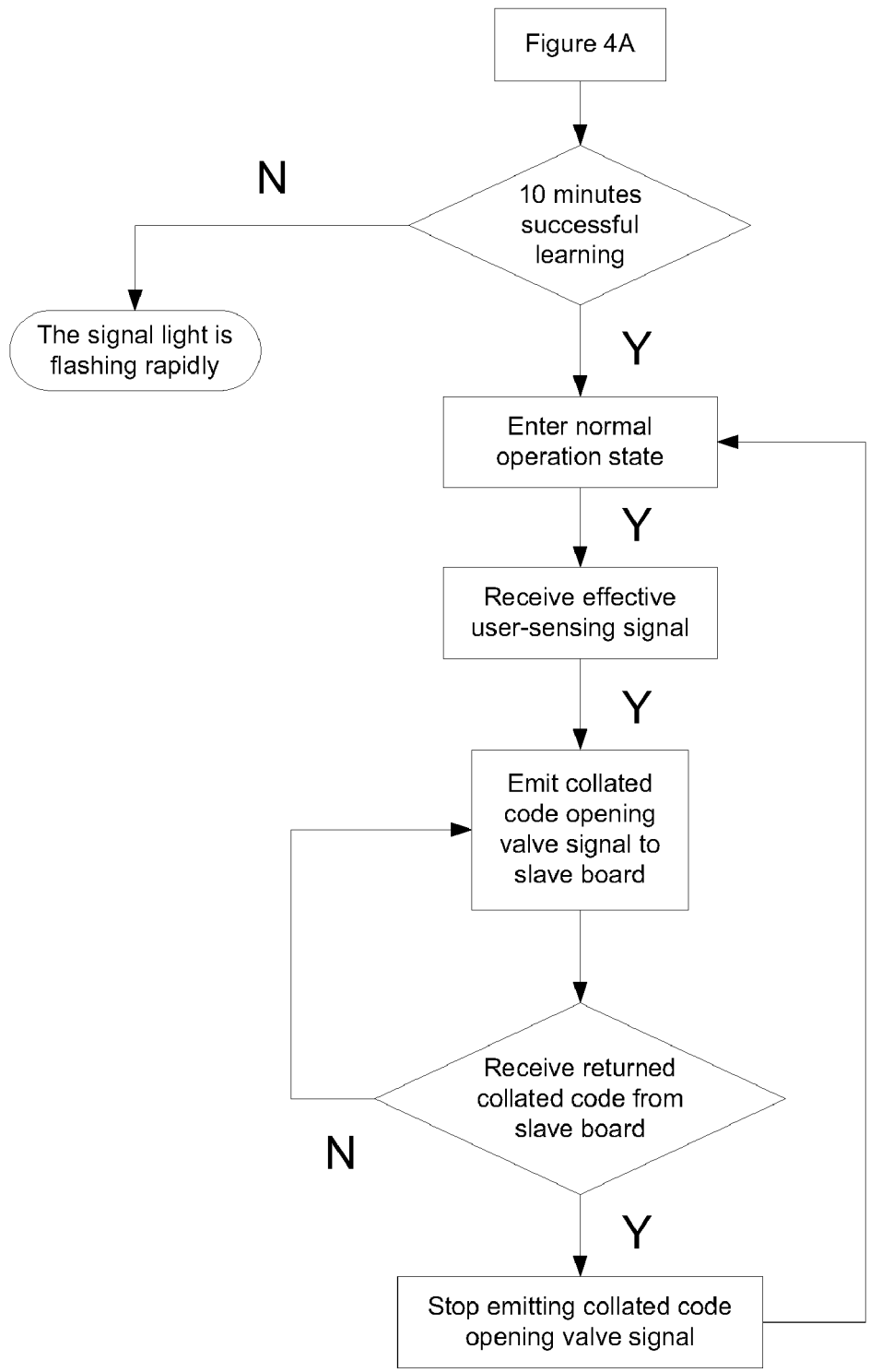
FIG. 4B is the continuation of the software flow drawing of FIG. 4A.
Figure 5:
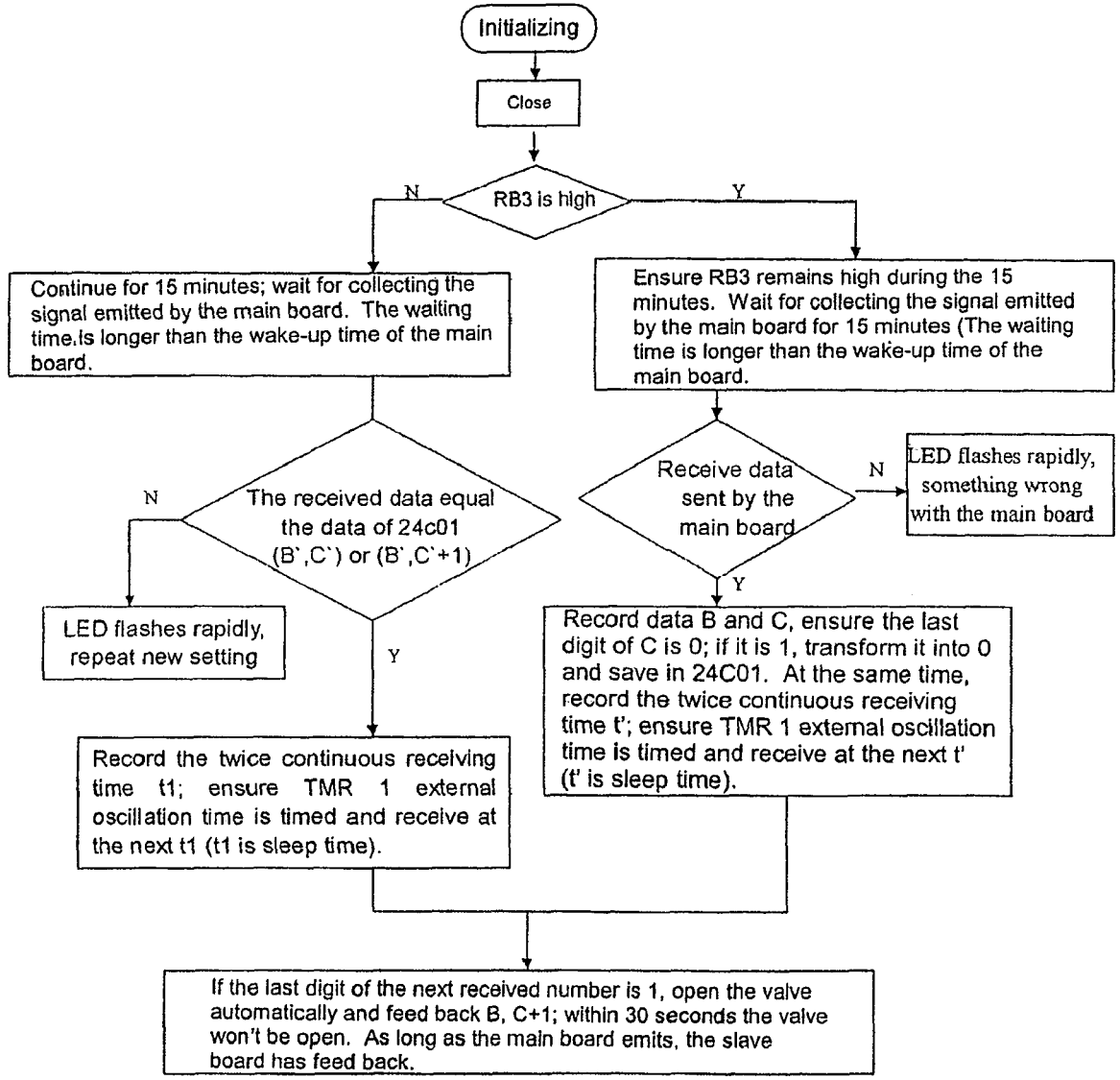
FIG. 5 is the software flow drawing of the slave circuit board.
Figure 6:
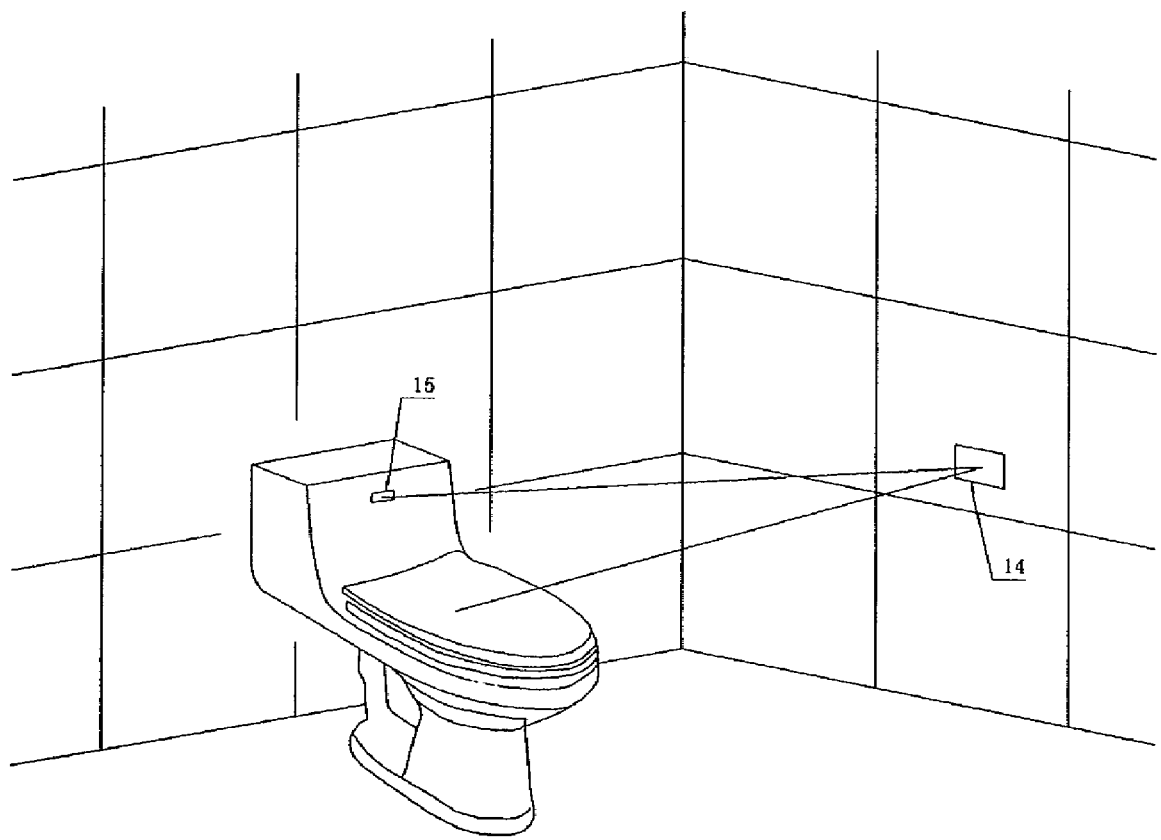
FIG. 6 is the schematic drawing of the installation of this utility model.

The form of the collated code is illustrated in FIG. 2. The setting of the collated code signal is illustrated in FIGS. 4A and 4B. A collated code setting is conducted for every product, so that each product possesses a unique collated code. The collated code is a 16-bit binary number, consisting of a 2-bit start bit, 13-bit data bit and 1-bit stop bit. Besides, a low-level signal is added to each bit through software. Therefore, the binary number 1 is displayed with a high level and a low level. The binary number 0 is displayed with 2 low levels. Among them, both start bits are 1, and the 13-bit data bit is a random number. The 13-bit data bit varies for every product. The last bit is a stop bit. When the bit is 0, it shows that the main and slave boards are in a collated-code state. When the bit is 1, between the main and slave boards, the state is "control solenoid valve". The following describes the specific collated code setting process. When the power is on, the timer inside the microcontroller begins to count. An external interruption signal is provided to the microcontroller to stop it from counting. At this time, the microcontroller records this random time constant, and after procession, the microcontroller saves the random time constant to the microcontroller's own EEPROM. Therefore, the needed collated code has been produced. The oscillation frequency adopted is 4 MHZ, so the timing precision is 1 μs. According to the demonstration form of the collated code, it is known that the collated code can produce $2^{13}$ different random numbers. In actual application, at the same location, it is impossible to use more than $2^{13}$ products at the same time, so the repetition rate is near zero. Therefore, the collated code of the products will not interfere with each other and error operation is avoided. In the event that the main board and the slave board are carelessly mixed up when a product is produced, the collated code can be reset so that the user does not have to waste time looking for the original code.

After the collated code is produced and processed by the microcontroller, the collated code is output to the infrared emitting diode in certain pulse form to send pulse signal. The pulse signal is received by the infrared receiving diode of the slave board. Afterwards, the signal is processed by the microcontroller into 16-bit collated code and saved into the microcontroller's own EEPROM. Now the collated code setting for both the main and slave board is complete.

Figure 3:
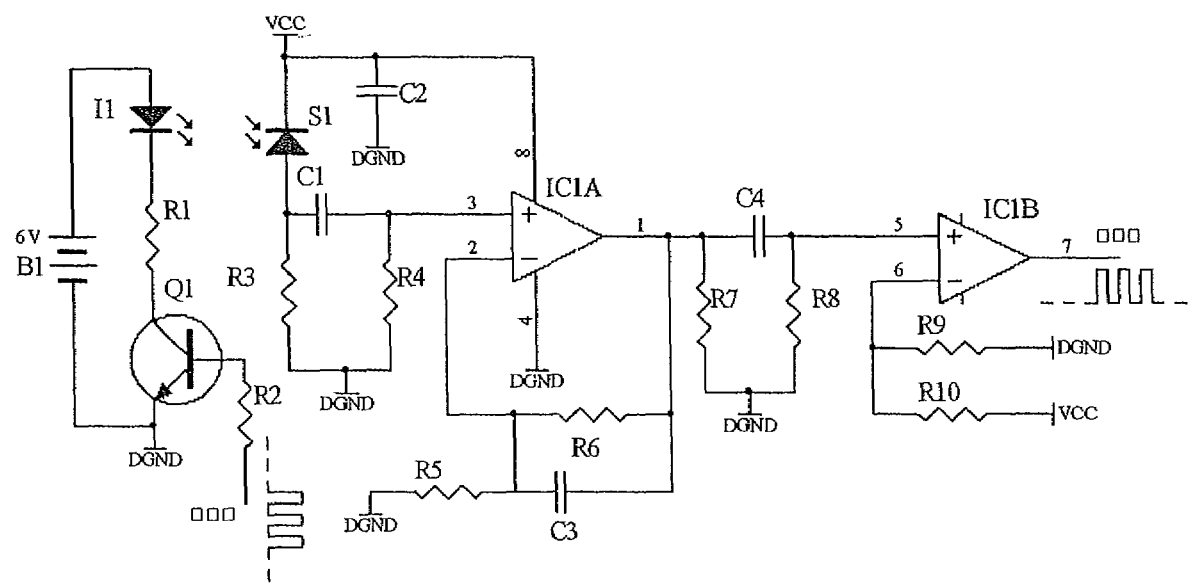
FIG. 3 is the principle drawing of the emitting and receiving of collated code of the entire hardware.

FIG. 3 shows the hardware principle of the infrared communication between the main board and the slave board. Another pair of infrared sending receiving diodes on the main board is used to detect a user. It sends an infrared signal in the form of a pulse. Once it detects a valid user-sensing signal, the microcontroller on the main board will output the collated code signal in EEPROM to QI of a Darlington transistor through resistor R2, so that the Darlington transistor is conducted. After the electric current passes the current limiting resistor R1, the infrared emitting diode II sends out this collated code signal. The infrared receiving diode S1 on the slave board receives the collated code signal; after the coupling wave-filtering of R3, R4, and CI, the signal is emitted to amplifier pin 3. After the signal is amplified, it is fed back through R5, R6 and C3 to input pin 2. The amplified signal from amplifier pin 1 is coupled and wave-filtered through R7, C4 and R8. Then it is sent to comparator pin 5. R9 and R1O provide a suitable compared voltage for comparator pin 6. After the comparison between the pin signal and the pin 6 compared level, the signal finally outputs regular high and low level signals and sends the level signals to the microcontroller, which collects the level signals as 1 or O. After the slave board microcontroller collects the 16-bit collated code signal, the slave board microcontroller compares this signal with the collated code signal stored in EEPROM of the microcontroller. If the code signals agree with each other, the codes are collated and the same collated code signal is returned to the main board for ensuring the success of the collated code. Otherwise, the main board will continuously emit the collated code signal until it receives the returned collated code signal from the slave board. After the collated code is successfully set, the slave board will operate to open the solenoid valve, and the wireless infrared communication is realized.

With this configuration, error flushing can be avoided due to the opening and closing of the toilet cover. At the same time, infrared communication technology is used to control the solenoid valve so that the valve avoids trouble with wire arrangement in installation.

Although the present invention has been shown and described herein by way of a preferred embodiment, it is understood that the invention may be modified without departing form the scope and spirit of the invention as defined in the following claims.

The invention claimed is:

1. A method of infrared communication in automatic sensing sanitary wares, the method comprising the steps of:
   communicating between a main circuit board and a slave circuit board;
   emitting infrared signals to detect a user by the main circuit board;
   detecting a user from the emitted infrared signals;
   emitting a collated code to the slave circuit board if the main circuit board detects a user;
   receiving the collated code by the slave circuit board;
   comparing the received collated code to a stored collated code on the slave circuit board; and
   enabling a sanitary ware through the slave circuit board if the received collated code from the main circuit board matches the stored collated code on the slave circuit board.

2. The method of claim 1, wherein the communication between the main circuit board and the slave circuit board is wireless.

3. The method of claim 1, further comprising the step of emitting the received collated code back to the main circuit board.

4. The method of claim 3, further comprising the step of continuing to emit the collated code to the slave circuit board if the received collated code to the main circuit board is not the same as the emitted collated code.

5. The method of claim 3, further comprising the step of stop emitting the collated code to the slave circuit board if the received collated code to the main circuit board is the same as the emitted collated code.

6. The method of claim 1, wherein the collated code exchanged between the main circuit board and slave circuit board can be set through a setting process.

7. The method of claim 6, wherein the collated code further comprises a start bit, a data bit and a stop bit.

8. An automatic sensing apparatus comprising:
   a main circuit board;
   a slave circuit board;
   an infrared signal emitter to detect a user by the main circuit board;
   a collated code emitter to emit to the slave circuit board from the main circuit board if the main circuit board detects a user;
   a receiver to receive the collated code by the slave circuit board; and
   a sanitary ware actuator enabled through the slave circuit board if the received collated code from the main circuit board matches a stored collated code on the slave circuit board.

9. The apparatus of claim 8, wherein the collated code emitter is a wireless emitter.

10. The apparatus of claim 8, further comprising a return collated code emitter to emit the received collated code from the slave circuit board back to the main circuit board.

11. The apparatus of claim 10, wherein the collated code emitter continues to emit the collated code to the slave circuit board if the received collated code to the main circuit board is not the same as the emitted collated code.

12. The method of claim 10, wherein the main circuit board stops emitting the collated code to the slave circuit board if the received collated code to the main circuit board is the same as the emitted collated code.

13. The method of claim 8, wherein the collated code exchanged between the main circuit board and slave circuit board is set through a setting process.

14. The method of claim 8, wherein the collated code further comprises a start bit, a data bit and a stop bit.

* * * * *